T. NICOLESCU.
GAGE.
APPLICATION FILED NOV. 30, 1917.

1,262,830.

Patented Apr. 16, 1918.

Inventor
Tanasie Nicolescu

Witness
Charles Belg.
Chas. W. Stauffiger

By
Attorneys

UNITED STATES PATENT OFFICE.

TANASIE NICOLESCU, OF DETROIT, MICHIGAN.

GAGE.

1,262,830.   Specification of Letters Patent.   Patented Apr. 16, 1918.

Application filed November 30, 1917. Serial No. 204,580.

*To all whom it may concern:*

Be it known that I, TANASIE NICOLESCU, a citizen of the United States, residing at Detroit, in the county of Wayne and State of Michigan, have invented certain new and useful Improvements in Gages, of which the following is a specification, reference being had therein to the accompanying drawings.

In the use of gages it is desirable that they be hinged so as to be readily centered in a lathe or other like machine and to be provided with interchangeable parts of various diameters, whereby a single holder can be used for any one of a series of test plugs proper.

This invention relates to test plugs or gages and to an arrangement thereof whereby the interchangeable test part itself is brought to center in a lathe or the like, is replaceable by another plug or test ring of different diameter and is generally so disposed as to be convenient for manipulation and adjustment.

The invention consists in the matters hereinafter set forth, and more particularly pointed out in the appended claims.

Figure 1:
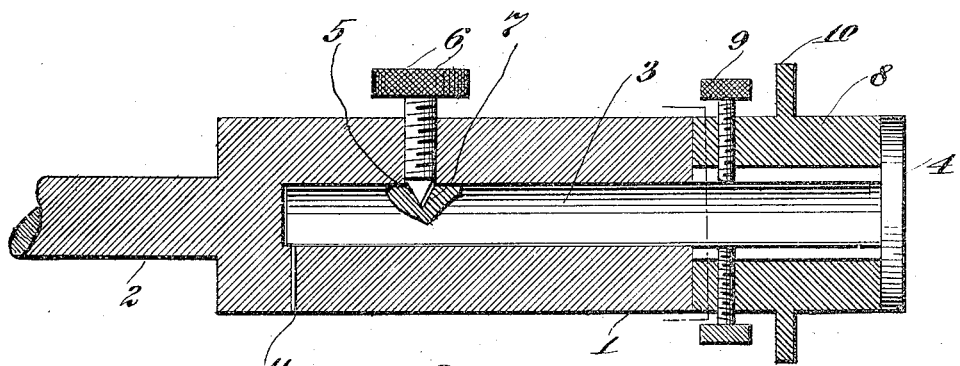
Figure 1 is a view in detail, partially in longitudinal section, and partially in elevation, of a test gage or plug embodying features of the invention.
Figure 2:
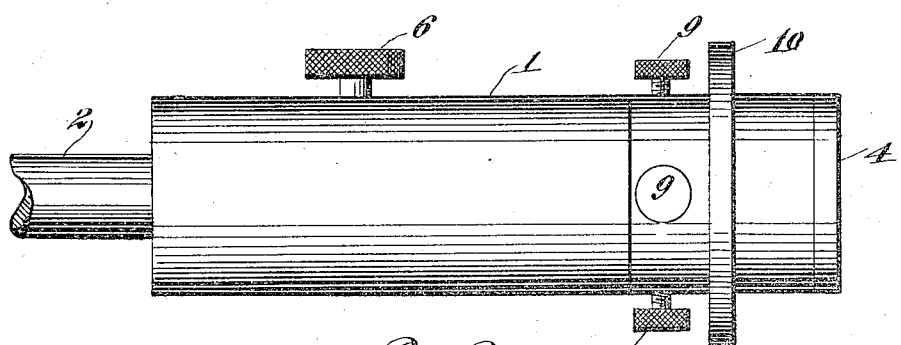
Fig. 2 is a view in elevation thereof.
Figure 3:
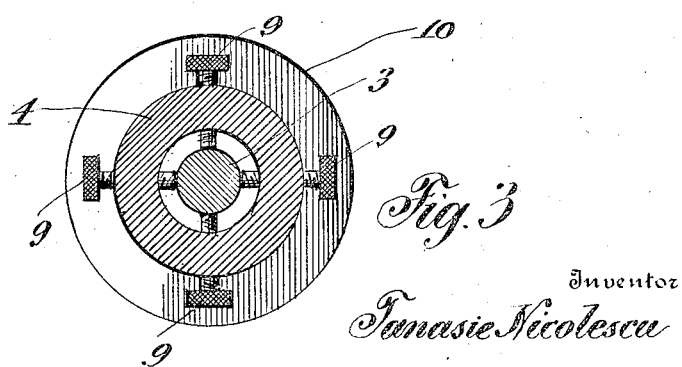
Fig. 3 is a view in section taken on or about line III—III of Fig. 1.

As herein shown in preferred form, a holding body or hollow spindle 1 has a shank 2 that may be inserted in the head or tail stock of the lathe as the case may be, or in other like tool. A clamping member 3 that is adapted to be inserted in the bore of the spindle 1, has a head 4, that, when the spindle is drawn in by the engagement of the tapered end 5 of the clamping screw 6 with a correspondingly bored recess 7 of the member 3, bears against and forces the body 8 of a test ring against the end of the spindle 1. The bore of the test ring is larger than the member 3 whereby centering screws 9, appropriately disposed in the member 8, can bring a test flange 10, which may be hardened independently of the rest of the body, into true center in any machine in which the device is placed. To enable the ready insertion and withdrawal of the member 3 in the bore of the spindle 1, an air vent 11 may be provided.

As a result of this construction a test gage or plug is obtained that is readily brought to center in any lathe or machine in which it may be mounted, that may have any number of test rings or plugs that can be adjustably secured on the holder, and that when once so adjusted and located, is easy of manipulation and possesses all the advantage of a solid single plug such as is common in machine shop practice.

Obviously, changes in the details of construction may be made without departing from the spirit of my invention and I do not care to limit myself to any particular form or arrangement of parts.

What I claim is:—

1. A test plug comprising a testing ring having a body and an annular flange thereon of hardened material, a clamping member having a head and a body of less diameter than the bore of the test ring body, a hollow spindle in which the clamping member may be inserted with the testing ring between the head thereof and the spindle end, and a clamping screw adapted to engage the inserted clamping member and force it inwardly into the spindle.

2. A test plug comprising a hollow spindle, a shank thereon for mounting the spindle in substantially axial alinement with a rotatable part of a machine tool, a clamping member having an outer head and a body insertible in the bore of the spindle provided with a recess in its periphery, a clamping screw in the spindle having a tapered end and centering the corresponding recess in the body of the clamping member when the clamping member is placed in the spindle, a test ring having a body with an internal diameter larger than that of the clamping member on which it is mounted between the head thereof and the end of the spindle, symmetrically disposed centering screws on the test ring for bearing against the body of the holder and bringing the ring to true center of rotation and a hardened flange on the testing ring extending beyond the centering screw head.

In testimony whereof I affix my signature in the presence of two witnesses.

TANASIE NICOLESCU.

Witnesses:
  KARL H. BUTLER,
  ANNA M. DORR.

Copies of this patent may be obtained for five cents each, by addressing the "Commissioner of Patents, Washington, D. C."